Aug. 25, 1925.
H. W. KRANZ
DISK WHEEL
Filed Oct. 3, 1924
1,551,256
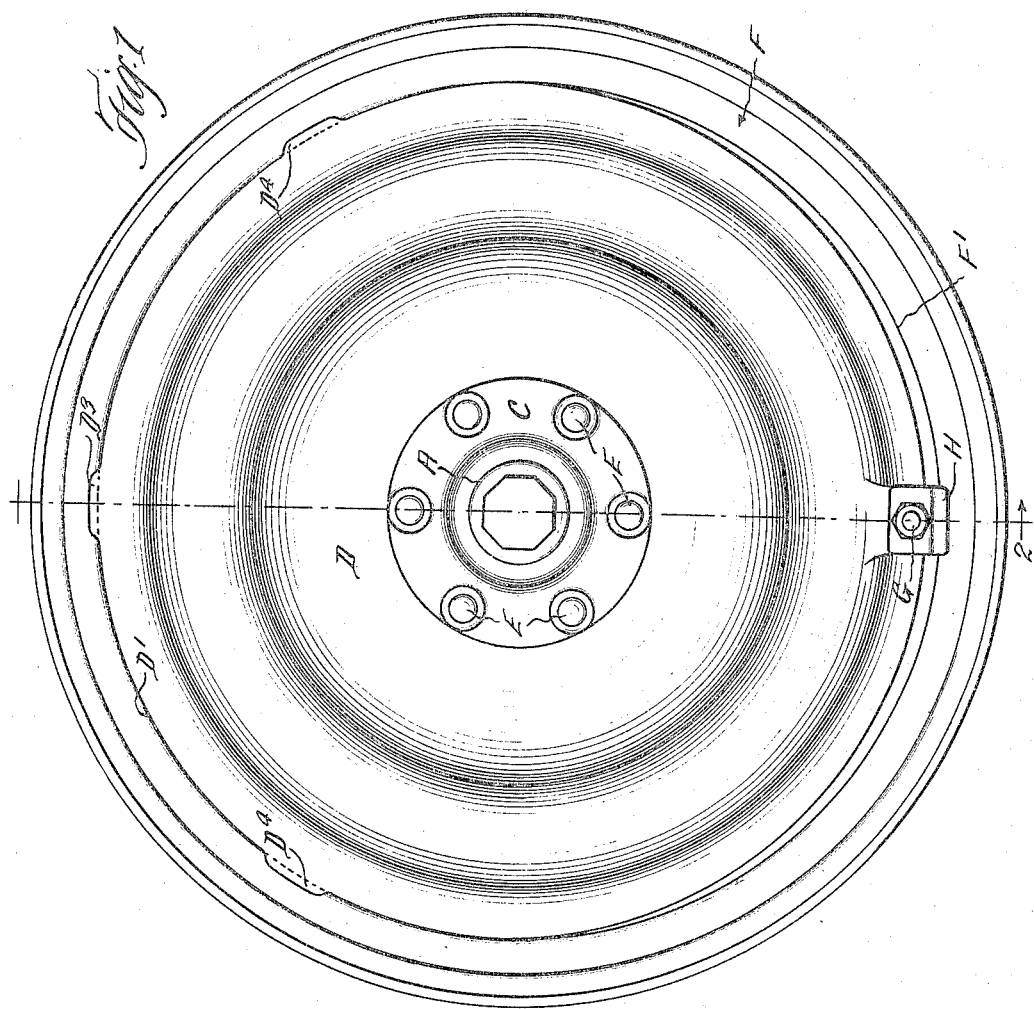
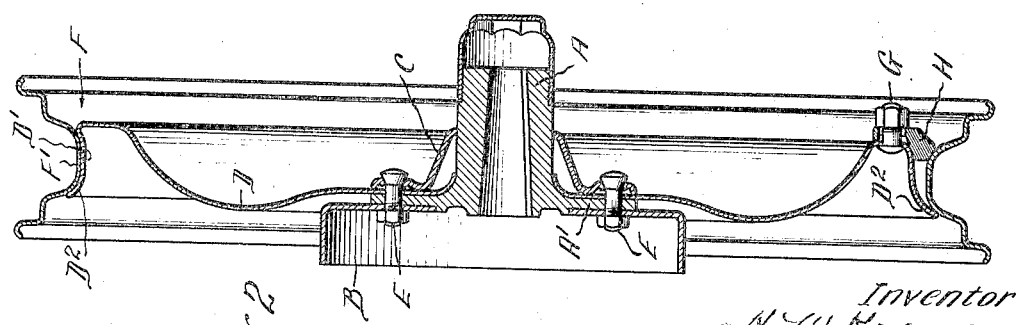
Inventor
H. W. Kranz
By
Attys.

Patented Aug. 25, 1925.

1,551,256

UNITED STATES PATENT OFFICE.

HARRY W. KRANZ, OF CLEVELAND, OHIO, ASSIGNOR TO THE HYDRAULIC STEEL COMPANY, OF CLEVELAND, OHIO, A CORPORATION OF OHIO.

DISK WHEEL.

Application filed October 3, 1924. Serial No. 741,330.

*To all whom it may concern:*

Be it known that I, HARRY W. KRANZ, a citizen of the United States, residing at Cleveland, in the county of Cuyahoga and State of Ohio, have invented a certain new and useful Improvement in Disk Wheels, of which the following is a full, clear, and exact description, reference being had to the accompanying drawings.

This invention relates generally to vehicle wheels and more particularly to a disk wheel having a demountable tire carrying rim.

The object of the invention is to provide an exceedingly simple method of fastening a simple construction of rim upon a simple form of disk.

Another object is to provide a wheel body particularly adapted for balloon tires and wheel of small diameters.

With these objects in view the invention consists in the various details of construction and in the manner of combining or arranging the same all of which will be fully described hereinafter and set forth in the appended claims.

In the drawings forming a part of this specification Fig. 1 is a face view of a wheel body and rim constructed in accordance with my invention and Fig. 2 is a vertical sectional view of the same.

Referring to the drawings, A indicates a hub having a flange A' and a brake drum B is connected to this flange. A flange ring C is also connected to this hub flange and helps to secure the disk D to the hub, there being hub bolts E employed to connect these parts together.

The disk D has a channeled peripheral portion D' the inner side of which terminates in a flange $D^2$. The bottom of the channel D' is not a true circle but is foreshortened upon the side opposite the valve stem hole. The flange $D^2$, however, is a true circle.

At a point in line with the valve stem hole, the periphery of the disk is formed with an outwardly projecting shoulder $D^3$ and at oppositely disposed points $D^4$. There are two other shoulders not quite as deep or high as the shoulders $D^5$.

The demountable tire carrying rim F has a central inwardly projecting portion F' so shaped in cross section that it will fit snugly in the half of the channeled periphery which is substantially one half of a circle.

The other half of the rim contacts with the flange $D^2$ when the rim is dropped down after the valve stem is inserted through the valve stem hole.

A bolt G is carried by the disk at a point opposite the shoulder $D^3$, and upon this bolt is a wedge clamp H which engages the inwardly projecting central portion F' of the rim F and a nut applied to the bolt G forces the clamp laterally inwardly which securely fastens the rim upon the wheel body for as the wedge clamp is screwed up the rim is forced laterally against the flange $D^2$ and the rim as a whole tensioned upon the wheel body being drawn down upon the semi-circular half at the same time that it is moved laterally into binding contact with the flange $D^2$.

Owing to the form of the disk and its channeled periphery, a very strong wheel body will be provided particularly adapted for receiving a rim having a central inwardly projecting portion which in turn is intended to receive a balloon tire, the deep central groove making it very easy to remove the tire casing when the tire is deflated.

Having thus described my invention, what I claim is:

1. The combination with a disk wheel body having a channeled peripheral portion provided with a flange at the inner side thereof, the base of the channel being foreshortened at one side, there being outwardly projecting shoulders at definite points opposite the foreshortened portion, of a demountable tire carrying rim having a central inwardly projecting portion seating in the channeled periphery, and a clamping wedge carried by the wheel body and adapted to engage the rim and secure the same upon the wheel body.

2. The combination with a demountable tire carrying rim having tire engaging flanges and a central inwardly projecting portion, said rim having a valve stem hole to receive the valve stem of a tire, of a disk having a channeled peripheral portion, said periphery having an outwardly projecting shoulder in line with said valve stem hole, and outwardly projecting at points upon opposite sides of the first named shoulder, said periphery being foreshortened at a point opposite the valve stem hole, a bolt carried by said disk at said foreshortened portion, a wedge clamp arranged thereon and contacting with said rim, and a nut for forcing the clamp into engagement with said rim.

In testimony whereof, I hereunto affix my signature.

HARRY W. KRANZ.